United States Patent [19]

Jones et al.

[11] Patent Number: 4,909,434
[45] Date of Patent: Mar. 20, 1990

[54] MOISTURE IMPERVIOUS CARTON HAVING ONE-PIECE POURING SPOUT SEALED TO INNERMOST AND OUTERMOST SURFACES

[75] Inventors: Donald E. Jones, Cleves; Michael T. Brown, Cincinnati, both of Ohio

[73] Assignee: The Procter & Gamble Company, Cincinnati, Ohio

[21] Appl. No.: 196,418

[22] Filed: May 20, 1988

[51] Int. Cl.⁴ .............................................. B65D 5/74
[52] U.S. Cl. ............................ 229/125.15; 220/258; 220/288; 220/359; 493/87; 493/133
[58] Field of Search ............... 222/540, 541, 551, 566; 229/125.13, 125.14, 125.15, 125.04, 125.09, 123.1, 123.2, 123.3, 3.1, 176; 220/258, 288, 304, 465, 359, 259; 215/232, 250; 156/69; 493/87, 133

[56] References Cited

U.S. PATENT DOCUMENTS

| | | | |
|---|---|---|---|
| D. 277,826 | 3/1985 | Brown, Sr. | D9/439 |
| 1,165,229 | 12/1915 | Davis | 222/83.5 |
| 1,357,304 | 11/1920 | Valdes | 229/125.15 |
| 2,104,744 | 1/1938 | Hothersall | 221/23 |
| 2,142,293 | 1/1939 | Waite | 221/60 |
| 2,156,366 | 5/1939 | Volk | 229/17 |
| 2,185,284 | 1/1940 | Wilson | 221/62 |
| 2,198,564 | 4/1940 | Robison | 221/78 |
| 2,400,716 | 5/1946 | Sattler | 229/125.15 |
| 2,418,659 | 4/1947 | Nyden | 222/498 |
| 2,543,909 | 3/1951 | Hatheway, Jr. | 222/566 |
| 2,670,885 | 3/1954 | Allen | 222/569 |
| 2,687,831 | 8/1954 | Miller | 222/569 |
| 2,690,861 | 10/1954 | Tupper | 222/498 |
| 2,820,581 | 1/1958 | Makuta | 222/528 |
| 2,946,478 | 7/1960 | Clair, Jr. et al. | 220/54 |
| 3,016,168 | 1/1962 | Larson | 222/189 |
| 3,029,009 | 4/1962 | Hill | 229/17 |
| 3,239,112 | 3/1966 | Porcelli | 220/258 |
| 3,282,477 | 11/1966 | Henchert | 222/541 |
| 3,300,106 | 1/1967 | Chmela | 222/517 |
| 3,334,797 | 8/1967 | Latham et al. | 229/7 |
| 3,412,919 | 11/1968 | Cain | 229/7 |

(List continued on next page.)

FOREIGN PATENT DOCUMENTS

| | | | |
|---|---|---|---|
| 534911 | 12/1956 | Canada . | |
| 0018325 | 10/1980 | European Pat. Off. . | |
| 2659275 | 7/1978 | Fed. Rep. of Germany . | |
| 1191109 | 10/1959 | France | 220/288 |
| 1349783 | 12/1963 | France | 220/288 |
| 1395697 | 3/1965 | France | 220/288 |
| 1093722 | 11/1960 | German Democratic Rep. | 220/288 |
| 964860 | 7/1964 | United Kingdom . | |
| 984756 | 3/1965 | United Kingdom | 220/288 |

*Primary Examiner*—Gary Elkins
*Attorney, Agent, or Firm*—E. Kelly Linman; John V. Gorman; Richard C. Witte

[57] ABSTRACT

A liquid-containing paperboard laminate carton including a one-piece plastic spout having a pair of opposing flanges sealed about an aperture in one of the carton walls to both the innermost and outermost surfaces of the carton wall. The double flange configuration not only forms a mechanically positive interlock between the plastic spout and the carton wall, but even more importantly, isolates the cut edges of the aperture from exposure to liquid either from within the container or from the environment through which the carton must pass from the point of manufacture until it is ready for disposal after its contents have been consumed. The spout preferably includes a liquid passageway having a membrane-type seal across its discharge orifice to provide evidence of tampering and a resealable closure member such as a screw cap or a snap-on closure held in place by means of a mating ring or groove on the spout. The cross-sectional area and configuration of the liquid passageway and discharge orifice in the spout are designed to prevent complete blockage by liquid when the package contents are being dispensed during a normal dispensing cycle, i.e., when the package is not being held completely upside down. Method and apparatus for securing the one-piece spout in sealed liquid type relation of both surfaces of the carton wall either sequentially or simultaneously are also disclosed.

23 Claims, 8 Drawing Sheets

U.S. PATENT DOCUMENTS

| | | | |
|---|---|---|---|
| 3,458,080 | 7/1969 | Laurizio | 220/27 |
| 3,481,515 | 12/1969 | Booth et al. | 222/529 |
| 3,608,771 | 9/1971 | Monroe et al. | 220/27 |
| 3,642,047 | 2/1972 | Waage | 150/8 |
| 3,659,756 | 5/1972 | Lancaster | 222/531 |
| 3,756,448 | 9/1973 | Moller et al. | 220/53 |
| 3,923,203 | 12/1975 | Anderson, Jr. | 222/153 |
| 3,924,777 | 12/1975 | Peyser | 220/277 |
| 3,933,297 | 1/1976 | Carlsson et al. | 229/3.1 |
| 3,968,872 | 7/1976 | Cavazza | 206/222 |
| 3,977,591 | 8/1976 | Martensson et al. | 229/7 R |
| 3,990,603 | 11/1976 | Brochman | 220/260 |
| 3,998,354 | 12/1976 | Song | 220/269 |
| 4,122,970 | 10/1978 | Amabili | 220/256 |
| 4,141,477 | 2/1979 | Hengesbach | 222/569 |
| 4,174,051 | 11/1979 | Edwards et al. | 222/105 |
| 4,214,675 | 7/1980 | Schmit | 222/83 |
| 4,227,629 | 10/1980 | Froyman | 222/566 |
| 4,231,488 | 11/1980 | Ward et al. | 220/288 |
| 4,241,855 | 12/1980 | Yoshioka | 222/479 |
| 4,244,491 | 1/1981 | Takahashi et al. | 229/125.14 |
| 4,344,472 | 8/1982 | Larkin et al. | 150/8 |
| 4,363,420 | 12/1982 | Andrews | 220/307 |
| 4,397,401 | 8/1983 | Ueno et al. | 220/260 |
| 4,448,326 | 5/1984 | Brochman | 220/270 |
| 4,483,464 | 11/1984 | Nomura | 222/83 |
| 4,488,661 | 12/1984 | Homma | 220/462 |
| 4,498,588 | 2/1985 | Scott | 206/526 |
| 4,520,940 | 6/1985 | Boyd et al. | 220/68 |
| 4,526,287 | 7/1985 | Miyamatsu et al. | 220/260 |
| 4,533,071 | 8/1985 | Uhlig | 222/498 |
| 4,553,693 | 11/1985 | Terajima et al. | 229/7 S |
| 4,555,037 | 11/1985 | Rhees | 220/258 |
| 4,570,826 | 2/1986 | Fattori | 222/83 |
| 4,582,216 | 4/1986 | Byrd | 220/260 |
| 4,588,105 | 5/1986 | Schmitz et al. | 220/359 |
| 4,595,116 | 6/1986 | Carlsson | 220/359 |
| 4,604,850 | 8/1986 | Reil | 53/423 |
| 4,605,136 | 8/1986 | Debetencourt | 215/232 |
| 4,624,392 | 11/1986 | Malpas et al. | 222/83 |
| 4,669,640 | 6/1987 | Ando et al. | 222/541 |
| 4,705,197 | 11/1987 | Gordon et al. | 206/604 |
| 4,723,689 | 2/1988 | Vallos et al. | 222/91 |
| 4,730,769 | 3/1988 | Stark | 229/125.15 |
| 4,733,786 | 3/1988 | Emslander | 215/232 |
| 4,753,832 | 6/1988 | Brown et al. | 229/176 |
| 4,813,578 | 3/1989 | Gordon et al. | 220/258 |
| 4,830,273 | 5/1989 | Kalberer et al. | 229/123.1 |

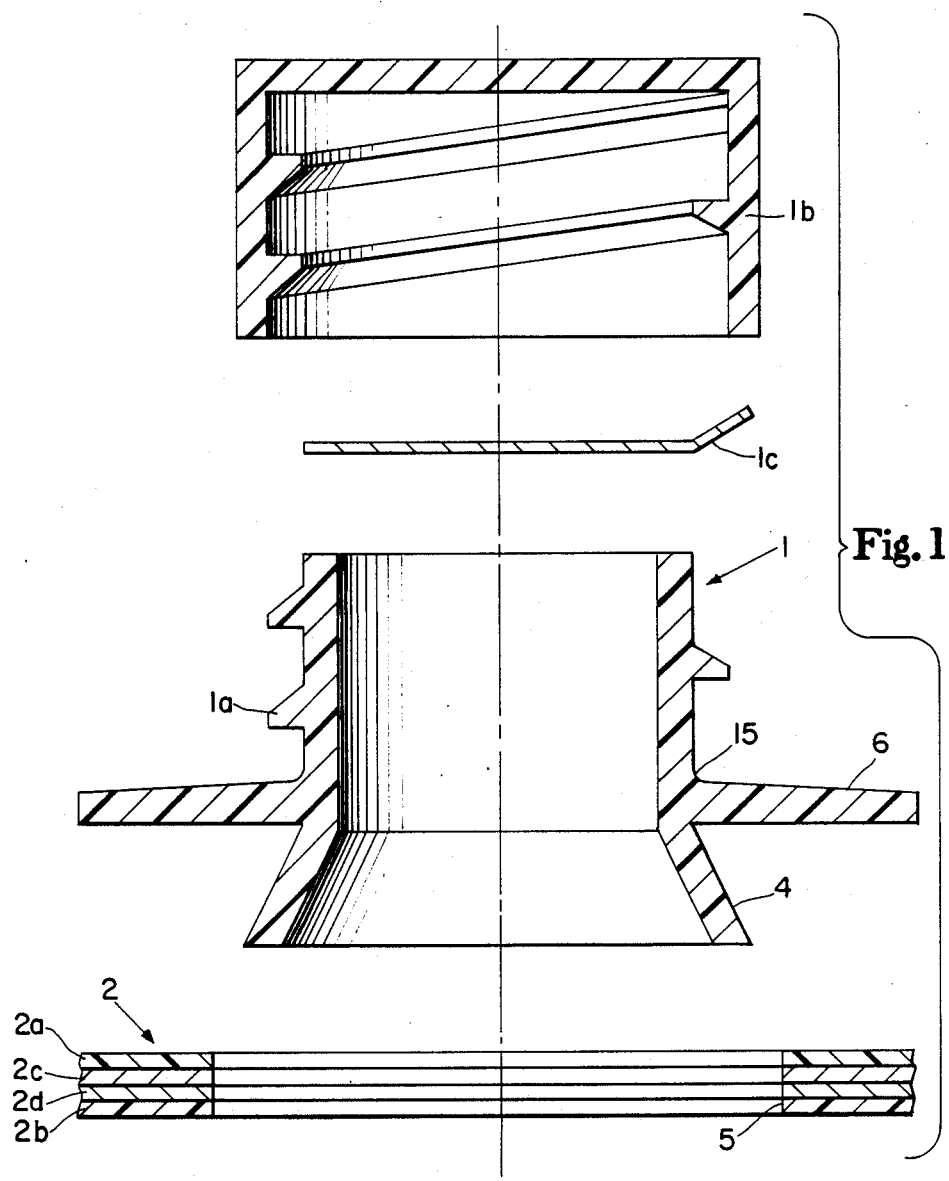

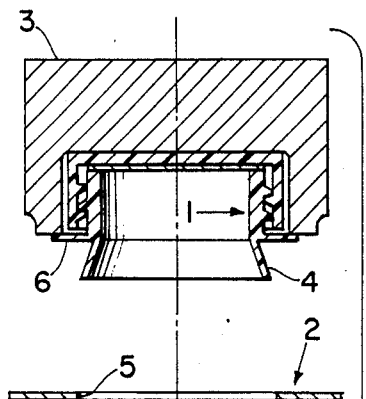
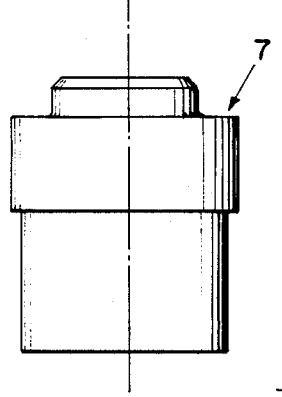
Fig. 2A
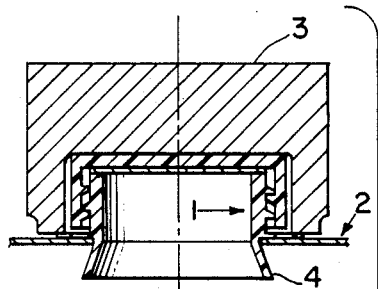
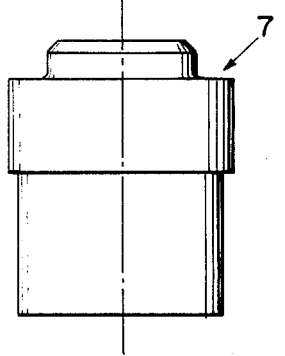
Fig. 2B

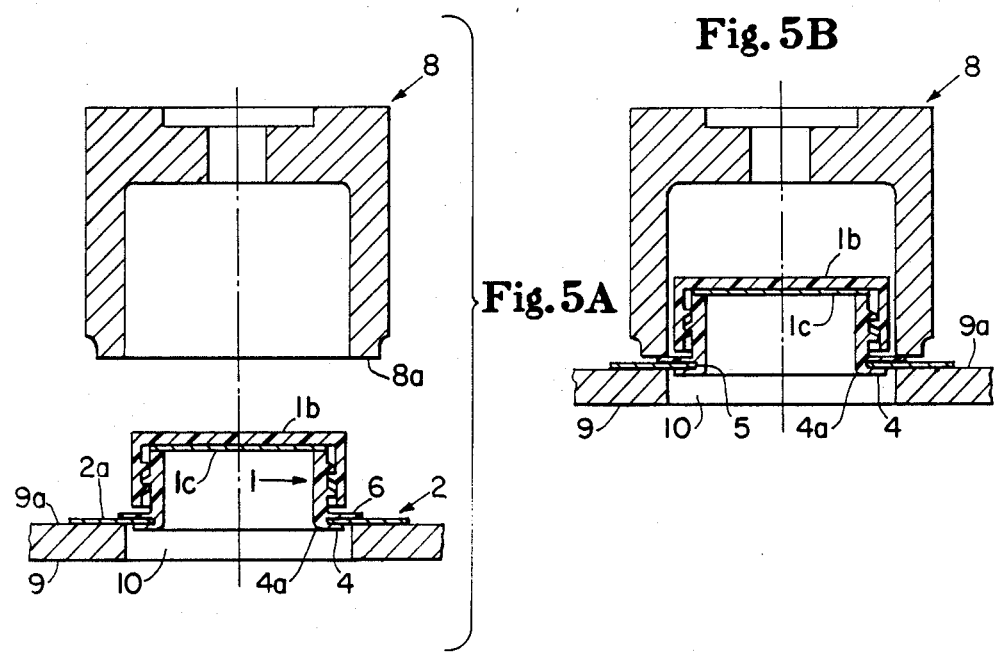
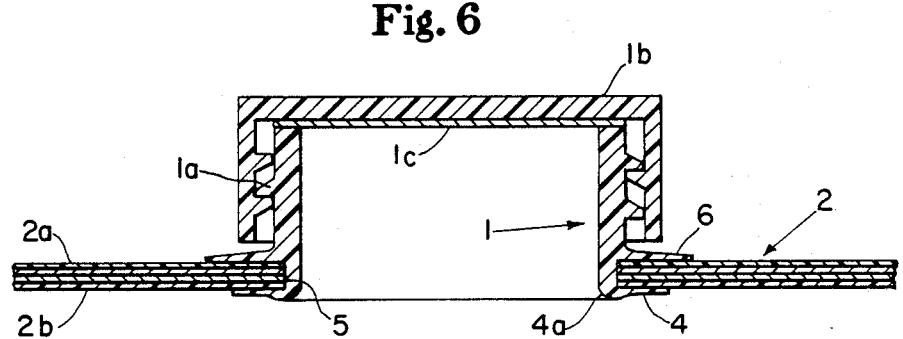

MOISTURE IMPERVIOUS CARTON HAVING ONE-PIECE POURING SPOUT SEALED TO INNERMOST AND OUTERMOST SURFACES

TECHNICAL FIELD

The present invention relates generally to packages, particularly cartons to be filled with liquid product such as milk, juice or beverages.

The present invention has further relation to such liquid containing cartons comprised of paperboard or like materials which have been coated to render their surfaces substantially impervious to moisture.

The present invention has further relation, in a particularly preferred embodiment, to a carton of the variety known as the gable top, having a double sloping top on a box-like body, with a pouring spout on one of the sloping sides through which the contained liquid is discharged.

The present invention has further relation to such cartons wherein the pouring spout is comprised of one piece and is sealed in liquid tight engagement to both the innermost and the outermost surfaces of the carton wall.

The present invention has still further relation to method and apparatus for securing said one piece spout in sealed liquid tight relation to both surfaces of the carton wall.

BACKGROUND OF THE INVENTION

The normal method of discharging a liquid from a gable top carton has been to open the sealed ridge of the gable by forcing its opposite sides away from each other. This practice has generally been found objectionable because of the considerable manual effort required as well as a potential hygienic problem, due to the need for direct manipulation of the gable top from which the liquid is to be poured. It also lacks tight reclosability, such as might be needed to shake a pulp containing juice product without splashing.

Reusable carton holding and pouring devices to engage a gable top carton have been developed in an attempt to overcome some of these problems. For example, U.S. Pat. No. 4,723,689 issued to Vallos et al. on Feb. 9, 1988 discloses one such holder having a pouring spout including a blade which cuts a circular opening in the carton wall upon rotation of the spout. However, such holders are not always available each time a consumer desires to open and dispense a liquid product from a gable top carton.

Accordingly, considerable effort has been exerted to mount an opening/reclosing feature, such as a plastic mouthpiece, in one of the sloping top walls of the gable top carton.

U.S. Pat. No. 4,214,675 issued to Schmit on July 29, 1980 discloses one approach which has been taken to dispense products such as wines or other alcoholic beverages wherein it is desirable to prevent the passage of air into the container once the dispensing process has been initiated. Schmit discloses a liquid containing pouch sealed within a carton. The pouch has a spout connected thereto which projects through a hole in the carton and which is secured to the carton by means of a flange and sleeve arrangement, said flange and said sleeve engaging one another by means of a friction fit. The spout includes a piercing means which is moved axially to rupture the pouch. Liquid to be dispensed passes from the pouch through the spout without coming in contact with the cut edge of the aperture in the paperboard carton. As the liquid is dispensed, the pouch collapses. A valve in the spout forms an airlock to restrict passage of air into the pouch during and after dispensing of liquids therefrom. This package is both difficult to manufacture and expensive.

Another container which does not include a pouch, but which does include a pouring spout is disclosed in U.S. Pat. No. 4,483,464 issued to Nomura on Nov. 20, 1984. Nomura discloses a container body having a hole of desired size in one of the sloping panels of the gable top, the inner surface of which is coated with a thermoadhesive plastic film or an aluminum foil laminated with such a film. A pouring spout body having an inner spout with a pouring channel and an air inlet is adhered over the aperture in the carton wall to the outermost surface of the carton by means of an integral flange. A cap is placed over the upper end of the pouring spout body. The pouring spout includes a blade for tearing the film adhered over the aperture in the container body to dispense the liquid contents of the container. Once opened, the cut edges of the aperture in the carton wall are exposed to the liquid contents of the carton. In the case of a paperboard carton coated with a liquid impermeable coating on its innermost and outermost surfaces, the cut edges of the aperture which are exposed by puncture of the sealing membrane tend to wick the liquid contents of the package into the paper, thereby destroying the integrity of the carton wall in the area where the spout is joined to its surface as well as creating an unpleasant physical appearance about the spout.

Still another sealed gable top carton having a mouthpiece of one piece construction is disclosed in U.S. Pat. No. 4,669,640 issued to Ando et al. on June 2, 1987. Ando et al. disclose a gable top carton comprised of paperboard and having an aperture cut in one of the sloping panels of the uppermost surface of the carton. Closing the aperture is a plastic mouthpiece of one piece construction. The majority of the embodiments disclosed in Ando et al. employ a flange located opposite a multiplicity of retainer lugs along the tubular passageway in the mouthpiece. In most of the disclosed embodiments, the mouthpiece is inserted from the innermost surface of the carton until the retaining lugs snap through the aperture and secure it in position for sealing. The flange located on the innermost surface of the carton wall is thereafter fused in liquid tight engagement to the edge portion of the wall around the aperture. The liquid contents of the carton pass through the tubular orifice in the one piece mouthpiece without coming in contact with the cut edges of the aperture. However, any liquid which comes in contact with the exterior of the carton, e.g., due to manufacturing wash down operations or due to condensation effects caused by temperature changes, wicks into the exposed cut edges around the aperture resulting in both poor appearance and structural degradation of the carton wall in the area of the mouth piece.

Ando et al. further disclose, in FIGS. 25 through 27, a mouthpiece embodiment which includes a flange which is sealed to the external surface of the gable top side wall around the aperture used for dispensing the liquid contents of the carton. However, this embodiment employs no innermost flange r liquid tight seal and so allows exposure to the cut edges of the aperture to the liquid contents of the carton both prior to and after opening of the carton by the consumer. Even if one were to provide an innermost moisture-barrier membrane to protect the cut edges of the aperture prior to opening of the carton by the consumer, once the moisture-barrier membrane is opened by the consumer the cut edges of the aperture would be immediately exposed to the liquid contents of the carton during the dispensing operation.

The aforementioned wicking problems of the aforementioned Ando et al. embodiment are even further aggravated due to the manner in which the mouthpiece is opened. In particular, the mouthpiece is opened by partially separating the sealed flange from the outermost surface of the carton wall and folding it back along a hinge line in the mouthpiece. This separation of the sealed flange from the exterior surface of the carton wall substrate tends to cause portions of the moisture resistant outermost layer of the carton wall to delaminate from the paperboard during the opening process and remain secured to the mouthpiece flange after it is opened. Raw edges of the paperboard are thereby exposed in areas over which the liquid being dispensed must pass, thereby further aggravating the wicking problem in the area surrounding the aperture in the carton wall.

There have been prior art attempts to solve the aforementioned wicking problems by applying pairs of polymeric layers to opposite surfaces of a carton board wall over an aperture in the carton board wall, joining the polymeric layers coinciding with the aperture to one another through the aperture and thereafter punching a hole through the central portion of the joined layers. U.S. Pat. No. 4,397,401 issued to Ueno et al. on Aug. 9, 1983 is representative of such an approach. These techniques are usually difficult to reliably execute. Perhaps more importantly, however, they do not provide an easily reclosable pouring spout suitable for shaking the product prior to dispensing or for mess-free dispensing of liquid products such as milk or juice from cartons comprised of paperboard laminate.

OBJECTS OF THE INVENTION

Accordingly, it is an object of the present invention to provide a liquid containing paperboard laminate carton including a one piece plastic spout having a pair of opposing flanges sealed about an aperture in one of the carton walls to both the innermost and outermost surfaces of the carton wall.

It is another object of the present invention to provide method and apparatus for securing said one piece plastic spout in sealed liquid tight relation to both the innermost and outermost surfaces of the carton wall.

DISCLOSURE OF THE INVENTION

In a particularly preferred embodiment the present invention comprises a gable top paperboard laminate carton for containing a liquid product such as milk, juice, etc. The innermost and outermost surfaces of the carton typically are coated with a polymer which is both liquid impermeable and preferably heat sealable.

One of the tapered side walls at the uppermost end of the carton preferably includes an aperture which is fitted with a one piece plastic spout. The spout includes a liquid passageway which preferably employs a membrane type seal across its discharge orifice to provide evidence of tampering and to prevent pilferage or contamination. The spout also preferably includes resealable reclosure means, such as a screw cap or a snap top cap held in place by a complementary ring and groove arrangement.

The spout is preferably molded from plastic and, prior to installation, includes an uppermost flange which contacts the outermost surface of the carton about an aperture in the carton wall. A lowermost flange is preferably formed after the spout has been inserted from the outside of the carton through the aperture in the carton wall by deforming the innermost surface of the spout via the application of heat and pressure. The carton contacting surfaces of both the uppermost (outermost) and lowermost (innermost) flanges are thereafter sealed in liquid tight relation to the outermost and innermost surfaces of the carton wall, respectively, about the periphery of the aperture. The sealing operation can be performed sequentially or simultaneously. The resultant double flange configuration not only forms a mechanically positive interlock between the plastic spout and the carton wall, but even more importantly, isolates the cut edges of the aperture from exposure to liquid either from within the container or from the environment through which the carton must pass from the point of manufacture until it is ready for disposal after its contents have been consumed.

In an alternative embodiment the spout is provided with an innermost flange and includes an accordian-like expandable segment along its length. This spout is inserted through a cut hole in the carton from inside the carton. The accordian-like segment is thereafter expanded by compressing the spout to form an outermost flange, and the flanges are thereafter sealed to the opposite surfaces of the carton wall about the periphery of the cut hole.

Whatever the configuration, the polymer comprising the plastic spout is preferably selected so that it will form a good liquid tight seal with the moisture impervious coatings on the outermost and innermost surfaces of the carton wall.

Care must be exercised during the flange forming and flange sealing operations to ensure that the moisture impermeable coatings on the outermost and innermost surfaces of the carton wall are not ruptured or melted away during the joinder process. Otherwise, liquid from either the interior or the exterior of the container will be allowed to reach the paperboard substrate through such breaches of the coating and thereby cause deterioration and/or unpleasant appearance of the paperboard in the area of the spout.

It has also been learned that it is highly desirable if the flanges on the outermost and innermost surfaces of the carton wall exhibit a degree of flexibility which is not starkly different from the flexibility of the carton wall. If the flanges are too rigid, mechanical movement of the spout may tend to cause delamination of the carton wall about the periphery of the flange or flanges, thereby exposing the underlying paperboard substrate to the liquid contents of the package and/or moisture in the surrounding environment through which the package must pass. As pointed out earlier herein, this causes degradation of the carton wall integrity and appearance in the area of joinder with the spout.

BRIEF DESCRIPTION OF THE DRAWINGS

While the specification concludes with claims particularly pointing out and distinctly claiming the present invention, it is believed the present invention will be better understood from the following description in conjunction with the accompanying drawings in which:

FIG. 1 is a greatly enlarged, simplified, exploded view of an apertured carton wall, a one-piece pouring spout, a tamper-evident sealing membrane and a threaded reclosure means of the present invention;

FIG. 2A is a simplified cross-sectional schematic illustration showing the fitment comprising a one-piece pouring spout, the tamper-evident sealing membrane and the threaded reclosure means after they have been inserted into the fitment receiver;

FIG. 2B is an illustration of the same components shown in FIG. 2A after the skirt on the one-piece pouring spout has been inserted through the cut aperture in the carton board wall;

FIG. 5A is a simplified cross-sectional illustration of the spout and carton shown in FIGS. 2A through 2D after the innermost flange has been deformed and sealed to the innermost surface of the carton wall;

FIG. 5B is a cross-sectional illustration generally similar to that of FIG. 5A, but showing an outermost anvil and an innermost anvil in supporting position to seal the outermost flange to the outermost surface of the carton wall;

FIG. 6 is a simplified cross-sectional illustration of a complete fitment of the present invention after both the innermost and outermost flanges have been sealed in liquid-tight relation to the innermost and outermost surfaces of the carton wall about the periphery of a cut hole in the carton wall;

DETAILED DISCLOSURE OF THE INVENTION

One-piece Plastic Pour Spout

Figure 2C:
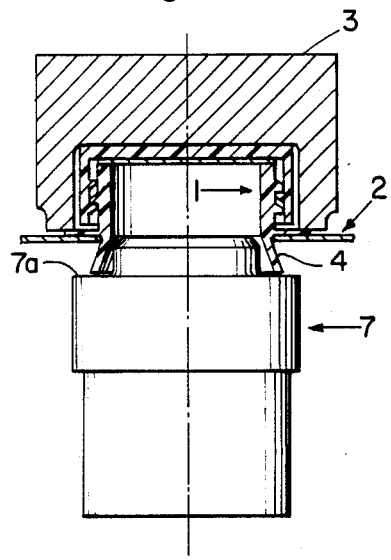
FIG. 2C is an illustration of the components shown in FIG. 2B after the inside anvil has been elevated into contact with the skirt of the one-piece pouring spout.

The present invention, in a particularly preferred embodiment, comprises a one-piece pouring spout that can be attached to a carton board package. The spout, which has a centrally located liquid passageway, can be sealed either simultaneously or sequentially to both the inside and outside surfaces of the carton board, thereby forming a pair of liquid-tight seals which protect the cut edges of the hole in the carton board wall from exposure to liquid. FIG. 1 is an exploded cross-sectional schematic showing a particularly preferred spout, carton wall, sealing membrane and resealable closure. The spout 1 has a threaded portion 1a, an outer flange 6, and a skirt section 4. A mating threaded cap 1b and a pull-tab equipped tamper-evident liner 1c, which is normally heat sealed across the discharge orifice of the spout, are preferably preassembled to the spout 1 to form a fitment which is attached as an assembly to the laminate carton board 2. If desired, the spout 1 could be provided with an external ring in lieu of the external thread shown in FIG. 1. In the latter case, the internal surface of the resealable closure means, e.g., cap 1b, could be provided with a mating groove to permit engaging and disengaging said cap and said spout with one another. Also, if desired, the positions of the mating ring and groove may be interchanged with one another, i.e. an external groove could be provided on the spout 1 and a mating ring could be provided on the internal surface of the cap 1b.

The laminate carton board 2 has an outermost layer 2a comprised of a polymeric material (typically low density polyethylene, hereinafter referred to as LDPE), and an innermost layer 2b comprised of a polymeric material (typically LDPE, a blend of LDPE and an Ionomer, glycol-modified polyethylene terephthalate, hereinafter referred to as PETG, or polyethylene terephthalate, hereinafter referred to as PET) and includes an aperture 5 which is large enough for the skirt section 4 to pass through before it is fully expanded. Embedded between the innermost and outermost layers there is normally provided a layer of cellulose carton board 2c and a barrier layer 2d typically comprised of a material such as foil, PETG or ethylene vinyl alcohol, hereinafter referred to as EvOH. The spout skirt 4 is expanded to form a flange and sealed in liquid-tight relation to the innermost layer 2b. The outer flange 6 is likewise sealed in liquid-tight relation to the outermost layer 2a, as will hereinafter be described in detail.

As pointed out earlier, cartons of the type generally disclosed herein have substantially water impervious layers 2b and 2a on their innermost and outermost surfaces, respectively. The innermost and outermost layers each typically exhibit a thickness in the range of about 0.0008 to about 0.0014 inches. The intermediate paperboard layer 2c has a typical thickness in the range of about 0.017 to about 0.024 inches. The barrier layer 2d typically exhibits a thickness in the range of about 0.000285 to about 0.00035 inches if comprised of aluminum foil and a thickness in the range of about 0.0006 to about 0.0017 inches if comprised of a polymeric material such as PETG or EvOH.

If a polymeric barrier layer 2d is employed in lieu of aluminum foil, another layer (not shown) is preferably sandwiched between the paperboard layer 2c and the innermost layer 2b to provide light blockage for products which are subject to degradation by light. This additional layer is typically comprised of pigmented LDPE having a thickness between about 0.0008 and about 0.0015 inches.

In an illustrative carton embodiment of the present invention the carton was constructed of a commercially available carton board 2. The innermost layer 2b was comprised of LDPE having a thickness of about 0.0014 inches, barrier layer 2d was comprised of aluminum foil having a thickness of about 0.00035 inches, layer 2c was comprised of paperboard having a thickness of about 0.0238 inches and outermost layer 2a was comprised of LDPE having a thickness of about 0.0008 inches.

Process Description

The inside flange expanding and sealing process is schematically depicted in FIGS. 2A-2D. To perform this operation the assembly comprising the threaded cap 1b, the spout 1 and the tamper-evident liner 1c sealed across the discharge orifice of the spout (hereinafter collectively referred to as the "fitment") is preferably brought into contact with the outermost surface 2a of the carton board 2 by the axial movement of the fitment receiver 3, as generally shown in FIG. 2A. Alternatively, the fitment can be placed through the cut hole in the carton beforehand and the fitment receiver then moved into position to support it. In either case, the skirt section 4 of the fitment passes through the cut hole 5 of the carton board and thus extends toward the inside of the package.

When the fitment receiver 3 finishes its downward axial movement, as shown in FIG. 2B, the fitment will be pressing on the carton board around the circumference of the cut hole 5. The fitment receiver 3 is preferably designed in such a manner as to contact the outer flange 6 and the top surface of the cap during the inside swaging/sealing step. Contact with the top surface of the cap during the swaging operation prevents the spout from backing away from the anvil during the swaging operation, while contact with outermost flange 6 prevents distortion of the carton board during the inside flange sealing operation. To ensure that this is possible, a nominal clearance is normally provided between the cap's top surface and surface 3a of the fitment receiver 3 in order to compensate for stack up height variations of the cap, sealing membrane and spout.

Once the outermost flange 6 on the spout portion of the fitment has been brought into intimate contact with the board 2 the inside sealing step can begin. Inside sealing of the fitment to the carton is accomplished through the upward axial movement of a heated anvil 7. The anvil 7 moves axially toward the skirt section 4 of the spout 1 of the fitment. Upon contact between the anvil 7 and the fitment it begins to heat and deform the skirt 4, as generally shown in FIG. 2C. The anvil 7 must transfer heat to the skirt section 4 rapidly and to such an extent as to cause softening, and preferably melting, of the plastic comprising the skirt. The anvil 7 continues to move toward the carton wall 2, squeezing the softened or molten plastic against the inside layer 2b of the carton wall 2. Positive pressure is necessary in order to squeeze out all air entrapped between the anvil 7 and the skirt 4 and between the skirt 4 and the inner layer 2b of the carton board. To minimize the chance of completely melting away the innermost layer 2b of the carton board 2 it is preferred that the anvil 7 not make direct contact with the innermost layer of the carton board during the flange swaging and sealing operaion.

Figure 2D:
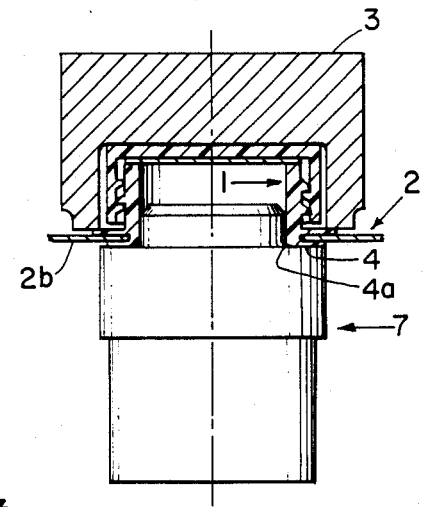
FIG. 2D is an illustration of the components shown in FIG. 2C, after the skirt of the one-piece pouring spout has been outwardly deformed to create an innermost flange which is sealed to the interior surface of the carton board about the periphery of the aperture in the carton board wall.

As a result of the squeezing action the softened or molten plastic from the skirt section 4 is brought into intimate contact with the innermost surface 2b in the carton wall, as generally shown in FIG. 2D, and strong adhesion results.

In a particularly preferred embodiment, the inner layer 2b of the carton wall 2 is comprised of LDPE and the spout 1 is comprised of high density polyethylene, hereinafter referred to as HDPE. Since these two polymers are both from the olefinic family, they are compatible and good adhesion is possible. The heat imparted from the anvil 7 to the flange 4 and from the flange 4 to layer 2b provides the energy necessary for molecular mixing between the HDPE in the skirt section 4 of the fitment and the innermost layer 2b of LDPE in the carton wall 2. In addition, the heat transfer from the anvil 7 to the skirt 4 softens the plastic of the spout 1, allowing the skirt 4 to bend without breaking. The force exerted by the anvil 7 improves the rate of heat transfer (through the expulsion of entrapped air) and provides the squeezing action needed to increase the cross-sectional area of the final seal on the package.

In a particularly preferred embodiment of the present invention the spout 1 is comprised of HDPE, and the skirt section 4 is heated beyond its crystalline melting point during the swaging and sealing operation. At temperatures above its crystalline melting point, i.e., about 273° F., the skirt 4 will deform more readily than at lower temperatures. In addition, performing the swaging and sealing step at temperatures above the crystalline melting point of the spout minimizes residual stress in the inner flange 4 after it has been sealed. Finally, the adhesive bonding between the HDPE in the skirt 4 and the innermost carton board layer 2b, which is preferably comprised of LDPE (crystalline melting point of about 230° F.), will be enhanced when the HDPE in the skirt 4 is melted.

Alternatively, the skirt section 4 of the spout 1 may simply be heated beyond its softening temperature without ever reaching its crystalline melting point. In this case it is preferable that the material in the skirt section 4 of the spout 1 have a higher crystalline melting temperature than the innermost polymeric layer 2b of the carton board. In the latter case it is preferred that the softened, but non-molten, skirt section 4 transfer sufficient heat to the innermost layer 2b of the carton board 2 to melt the innermost polymeric layer 2b of the carton board 2.

In still another embodiment of the present invention the innermost layer 2b of the carton board 2 could be specially treated about the perimeter of the cut hole 5 to promote adhesion with the skirt 4 of the spout 1. For example, a surface treatment such as corona discharge or hot gas plasma could be applied to the innermost layer 2b of the carton board 2. Alternatively (or additionally), a pressure sensitive or heat activated adhesive which is resistant to liquid could be applied to these areas of the carton.

The sealing operation is controlled by the temperature of the anvil 7, the force exerted by the anvil 7 on the skirt section 4 of the spout 1 and by the anvil/skirt contact time. Other variables that play an important part in the sealing process include anvil geometry, anvil surface characteristics (i.e., non-stick), skirt geometry, skirt material, component materials of the carton board and alignment of the sealing apparatus.

Fitment Receiver

Figure 4:
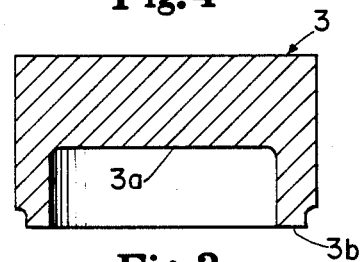
FIG. 4 is a simplified cross-sectional illustration of the fitment receive shown in FIGS. 2A through 2D.

FIG. 4 is a cross-sectional view of a preferred embodiment of a fitment receiver 3. The fitment receiver 3 has three primary functions. Firstly, it acts to align the fitment with both the axis of the cut hole 5 in the carton and the inside anvil 7. Secondly, the fitment receiver 3 supports the fitment spout via surface 3a during the inside flange swaging step. Thirdly, the fitment receiver 3 supports the outer flange 6, and consequently the carton board 2, via surface 3b during the inside flange sealing step.

It is therefore desirable that both the spout portion of the fitment and the carton board 2 be supported during 1 the inside flange swaging and sealing step.

As will be appreciated by those skilled in the art, excessive movement of either the fitment or the carton board 2 during the swaging or sealing step can compromise the surface area of the inside flange seal. Because it would be difficult to provide simultaneous support of both the outer flange 6 and the cap's top surface for the entire range of stack-up heights normally encountered with the assortment of caps, sealing membranes and spouts used to assemble each fitment, the fitment receiver 3 is preferably designed so as to always contact the top of the cap first and thereafter allow for some upward movement of the flange 6 and carton board 2 surrounding the cut hole 5 when the anvil moves upwardly. Typical stack-up height variations of about 0.007 inches or less total indicator run-out have not posed any significant problems in the disclosed application.

In an alternative embodiment of the present invention a fitment receiver 3 having surfaces 3a and 3b which are, at least to a degree, resilient could be employed to avoid the stack-up height variation problem. The resilient surfaces of the fitment receiver 3 would deform in direct relation to the variations in stack-up height of the fitment.

Inside Anvil

Figure 3:
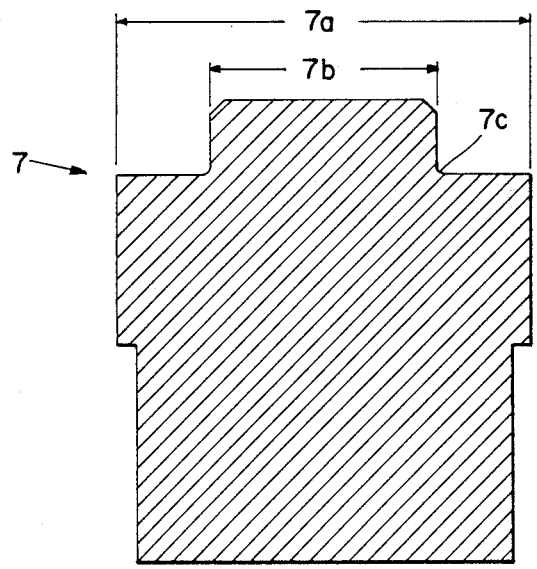
FIG. 3 is a greatly enlarged simplified cross-sectional illustration of the inside anvil used to deform the skirt on the pouring spout and effect a seal against the innermost surface of the carton board wall.

FIG. 3 is an enlarged cross-sectional view of the anvil 7 used for inside sealing. It has a major and minor diameter as indicated. The major diameter 7a affects the limit of the outside diameter of the inner seal. The minor diameter 7b defines the plug portion of the anvil and is designed to substantially correspond with the inside diameter i.e., the liquid passageway of the spout 1 of the fitment. The plug portion of the anvil provides a means of preventing excessive flow of plastic toward the inside of the spout. The corner 7c of the anvil should be designed in such a manner as to minimize excessive thinning of the skirt elbow 4a of the spout 1. This can be accomplished by judicious selection of a small radius, no radius or a slight recess, as generally shown in FIG. 3. Whatever its configuration, the anvil 7 is also preferably coated with a non-stick material so that it does not stick to the workpiece.

Alignment of Fitment Receiver and Anvil

Axial alignment of the fitment receiver 3 (and consequently the spout 1), the cut hole 5 in the carton wall 2 and the anvil 7, as generally shown in FIGS. 2A-2D, is important to the formation of acceptable liquid tight seals. Substantial offsets in axial alignment will result in thinning of the spout wall at the elbow portion 4a.

Substantial offsets in parallelism between anvil surfaces 3a, 3b and the corresponding horizontal surfaces of anvil 7 are also undesirable, since they will result in variations in the amount of force being applied to the skirt 4 during sealing. These variations may result in seal thickness variations and, in extreme cases, incomplete seals.

Outside Seal Design and Process Issues

FIGS. 5A and 5B are a schematic cross-sectional representation of the outside flange sealing process. The procedure for outside sealing is generally similar to that of the inside. A heated anvil 8 is brought into contact with the outer flange 6 of the spout 1 of the fitment. The anvil, which is preferably maintained at a constant temperature throughout the sealing process, transfers heat via surface 8a to the flange 6, thereby causing the material of the flange to soften and preferably to melt. Force applied to the anvil 8 in the axial direction is likewise transferred to the flange 6, thereby forcing the softened or molten plastic to adhere to the outer surface 2a of the carton board 2. The anvil 8 provides positive pressure on the flange 6 throughout the sealing cycle. To minimize the chance of completely melting away the outermost layer 2a of the carton board 2, it is preferable that the heated anvil 8 not touch the outermost layer of the carton board during the sealing operation.

The inside surface of the carton board 2 is supported during the outside flange sealing operation by an innermost anvil 9 having an aperture 10 slightly larger than the innermost flange formed from skirt 4, as generally shown in FIG. 5B. To ensure that it does not stick to the workpiece, the anvil 8 is preferably coated with a non-stick material such as Teflon. If desired, the supporting anvil 9 can be similarly coated.

The anvil temperature, the force applied on the flange 6 by the anvil 8, the anvil/flange contact time, the flange material, the flange thickness and the carton board outer layer material are all variables which can impact upon sealing. As in the case of inside sealing, the sealing equipment is designed to be robust and maintain good axial tolerance between the centerline of the fitment and the centerline of the anvils 8 and 9. The lowermost anvil surface 8a of anvil 8 should also be parallel with the uppermost surface 9a of supporting anvil 9, and consequently with the outermost surface 2a of the carton board 2 to ensure uniformity of the final seal.

The final liquid tight seal of the outer flange 6 will be an annulus substantially conforming to the inside and outside diameters of the anvil 8. The final thickness of the outside seal is preferably in the range of about 0.001 to about 0.015 inches. When the seal thickness is within this range, the plastic, once solidified, will normally maintain adherence to the outermost layer 2a of the carton board 2 even if the carton board undergoes a degree of deformation in handling and use. For an HDPE spout 1, a final outer seal thickness of less than about 0.008 inches is most preferred. If the sealed portion of the flange is too thick, and consequently too rigid to flex with the carton board, it has difficulty in conforming to the board when the carton board undergoes minor deformations, and delamination of the board may occur in the area of the seal.

To minimize such carton board delamination problems, it is preferable that the thickness of the perimeter of outer flange 6 of the spout be kept to a minimum prior to sealing. This in turn, minimizes large differences in thickness between the carton board and the flange 6 sealed thereto. Another means of minimizing the effects of large thickness differences between the board and the flange or flanges is to provide for a gradual taper or radius between the thick and thin sections of the flange or flanges, as generally shown with respect to flange 6 of the spout 1 shown in FIG. 1. Since the anvil deforms the plastic that it contacts, a radius or taper can also be formed at the same time that the flange is adhered to the package if the anvil is properly shaped.

Spout Design

FIG. 1 includes a simplified cross-sectional view of a particularly preferred plastic spout 1 used in cartons of the present invention. It has an internal liquid passageway, a threaded portion 1a, an outer flange 6 and a lower skirt 4. While the present invention is not limited to any particular discharge orifice size, the threaded portion 1a of spout 1 is preferably designed to accept a standard threaded cap in the 28 to 38 mm range. As an illustrative example, a 33 millimeter threaded cap having dimensions corresponding to SPI guidelines SP-400 has been found particularly well suited for use on a 64 oz. juice carton.

The overall length of the installed spout is preferably sufficient that liquid discharged through the discharge orifice is unable to strike the carton wall to which the spout is secured during a normal dispensing operation. In addition the cross-sectional area and configuration of the liquid passageway and discharge orifice at the spout are designed so that liquid being discharged from the carton cannot completely block the liquid passageway in the spout during a normal dispensing operation, i.e., one in which the carton is not completely inverted. This permits the carton to remain vented to the atmosphere throughout the dispensing operation, thereby avoiding the glugging problems which normally result if a vacuum is established within the carton during dispensing. On a 64 oz. juice carton, a centrally located spout having a liquid passageway measuring approximately one inch in diameter and an overall installed length of approximately one half inch produced very acceptable dispensing characteristics.

The outer flange 6 of spout 1 is preferably configured and sized to optimize the needs of molding, heat sealing and structural integrity. The illustrated flange 6 is radially tapered to ease its manufacture as well as to minimize its thickness, as measured about its periphery. The illustrated spout is preferably made via an injection molding process.

As pointed out earlier herein, the outer flange 6 is sealed to the outer surface of the carton in a manner generally similar to that of the skirt 4. The flange 6 is preferably thin to enhance the rate of heat transfer from its uppermost anvil contacting surface to its lowermost carton board contacting surface. To maximize structural integrity, large step-like increases in the thickness of the flange cross-section are preferably avoided. The spout embodiment 1 depicted in FIG. 1 includes an outer flange 6 having a gradual taper. Once sealed to the outermost layer 2a of the carton board 2, the sealed portion of the outer flange 6 will be considerably less in thickness than that portion of the flange located adjacent the threaded wall. This difference in flange cross-section should be kept to a minimum in order to avoid the establishment of a major stress concentration at this point. If this thickness variation is too large the concentration of stress which would be present at the point of joinder could result in failure of the flange at the point of joinder to the thicker section when the spout is subjected to movement. Failure of the flange inboard of the seal with the outermost layer 2a of carton board 2 will, of course, defeat the liquid tight seal established by the flange, allowing liquid to migrate to the exposed paperboard edge 2c at the cut hole 5 in the carton board 2. To minimize this chance, a generous radius 15 is preferably provided at the intersection between the outer flange 6 and the threaded portion 1a of the spout to reduce the concentration of stress in that area.

Extending below the outer flange 6 of the spout 1 is the skirt section 4. The skirt section 4 is preferably initially outwardly tapered, as generally shown in FIG. 1, to enhance its foldover during the swaging portion of the inner heat sealing operation. For highest seal quality, the thickness of skirt section 4 is preferably substantially uniform. Skirt thickness variations of no more than about ±0.001 inches are particularly preferred.

The total thickness of the skirt 4 is likewise important. First, it directly affects the amount of heat that must be generated in order to soften the skirt section (thicker skirts will require more heat). Second, it affects the strength of the overall attachment, since the elbow 4a of the spout serves to transfer stresses applied to the top threaded portion 1a of the spout 1 to the carton board 2. FIG. 6 shows a simplified cross-section of the skirt in its final sealed position on the carton board 2. If the thickness at elbow 4a is too thin, the spout 1 may fail prematurely when the spout is subjected to movement. For the exemplary 33 millimeter threaded spout comprised of HDPE, described earlier herein, a thickness at elbow 4a of about 0.020 inches has generally been found acceptable.

The length of the skirt 4 will have an effect on the surface area of the final innermost seal. Longer skirts will, of course, allow for larger sealed areas. However, if the skirt length is sufficient to extend to or beyond outer flange 6, it may be necessary to simultaneously seal the innermost and outermost flanges to the opposing wall surfaces of the carton. As will be appreciated by those skilled in the art, the conservation of volume equation can be used to correlate skirt length and skirt thickness to final seal thickness and area.

Alternate Outside Sealing Processes

Figure 9:
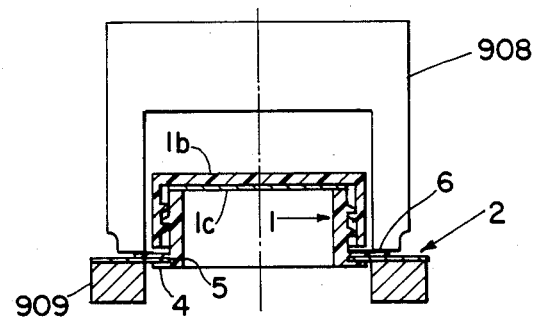
FIG. 9 is a simplified cross-sectional schematic illustration of an alternative system for sealing the outermost flange of the spout to the carton board.
Figure 10:
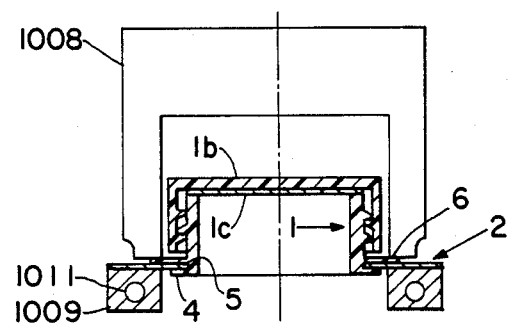
FIG. 10 is a simplified cross-sectional illustration of another alternative system for sealing the outermost flange of the spout to the carton board.
Figure 11:
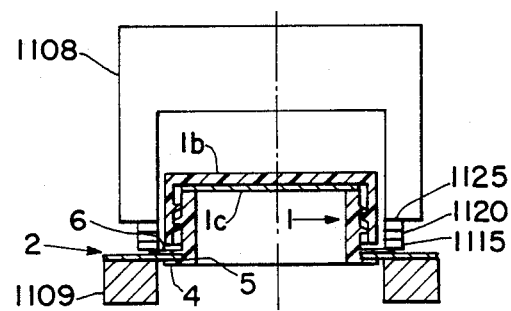
FIG. 11 is a simplified cross-sectional schematic illustration of still another alternative system for sealing the outermost flange of the spout to the carton board.

FIGS. 9, 10 and 11 are schematic cross-sectional representations of several alternate systems for sealing the outside flange 6 of the fitment to the outermost layer 2a of the carton board 2. These schematics show the relative positioning of the tooling, fitment and carton during sealing.

The illustrated alternate sealing processes are: (1) an ultrasonic sealing process, FIG. 9, (2) an induction sealing process, FIG. 10, and (3) an impulse sealing process, FIG. 11. In all these processes, the fitment and tooling alignment criteria described earlier in the section of the present specification entitled "OUTSIDE SEAL DESIGN AND PROCESS ISSUES" are generally applicable.

The ultrasonic sealing process shown in FIG. 9 has two primary elements, a horn 908 and a support anvil 909. The horn 908 generates mechanical vibrations at the outermost flange to carton interface. These vibrations create relative movement between the fitment and carton. Axial pressure and friction generate heat at their interface. The anvil 909 provides support to the fitment and carton during this process. The critical process variables are horn frequency along the axis of the fitment (typically about 20,000 cycles/sec), horn loading along the axis of the fitment (typically between about 60 and about 260 psi), horn amplitude along the axis of the fitment (typically between about 0.002 and about 0.005 inches), and the time the horn is in contact with the fitment (typically between about 0.1 seconds and about 5.0 seconds).

The induction sealing process shown in FIG. 10 also has two primary elements, the heating anvil 1008 and the support anvil 1009. Embedded in the support anvil 1009 is an electric current carrying wire or tube 1011 that, when energized, generates an oscillating electromagnetic field around the wire or tube. The metallic heating anvil 1008 which is located within the electromagnetic field and in contact with the flange 6 during sealing will heat up when the magnetic field is energized. Under axial loading, the heated anvil 1008 will conduct this heat to the fitment flange 6, soften or liquefy the plastic and bond the flange 6 to the outermost carton surface 2a. If induction sealing is employed with the heating and support anvil configuration shown in FIG. 10 it is generally preferable that barrier layer 2d of carton board 2 be comprised of a non-metallic material such as PETG or EvOH rather than foil, since the oscillating electromagnetic field will also introduce heat into the carton board 2 via layer 2d if the latter is comprised of a metallic material. Alternatively, the heating and support anvils could be reconfigured so that heat introduced into the carton board 2 via layer 2d does not produce degradation of the innermost flange seal, innermost layer 2b or sticking to the support anvil 1009. If desired the wire or tube 1011 may be water cooled to minimize cycle time.

The impulse heating process shown in FIG. 11 likewise has two primary elements, a heating anvil 1108 and a support anvil 1109. The heating anvil 1108 comprises of a very thin release material 1115, a thin, low resistance, metallic, current carrying wire (typically Invar) 1120, which is geometrically shaped like the flange seal and an insulating material 1125. This heating anvil may also be water cooled. The anvil 1109 provides support to the flange 6 and carton wall 2 when the heating anvil 1108 is brought into contact with the fitment flange 6 under pressure. The current carrying wire 1120 is energized with a high voltage current, and heats up almost instantaneously. The heat is conducted to the fitment flange 6, softens or liquifies the plastic and bonds the flange 6 to the outermost carton surface 2a. After the flange material bonds to the carton, the current is turned off, and the heating anvil preferably remains in place until cooling of the flange is substantially completed.

Simultaneous Inside/Outside Sealing Process

Figure 8A:
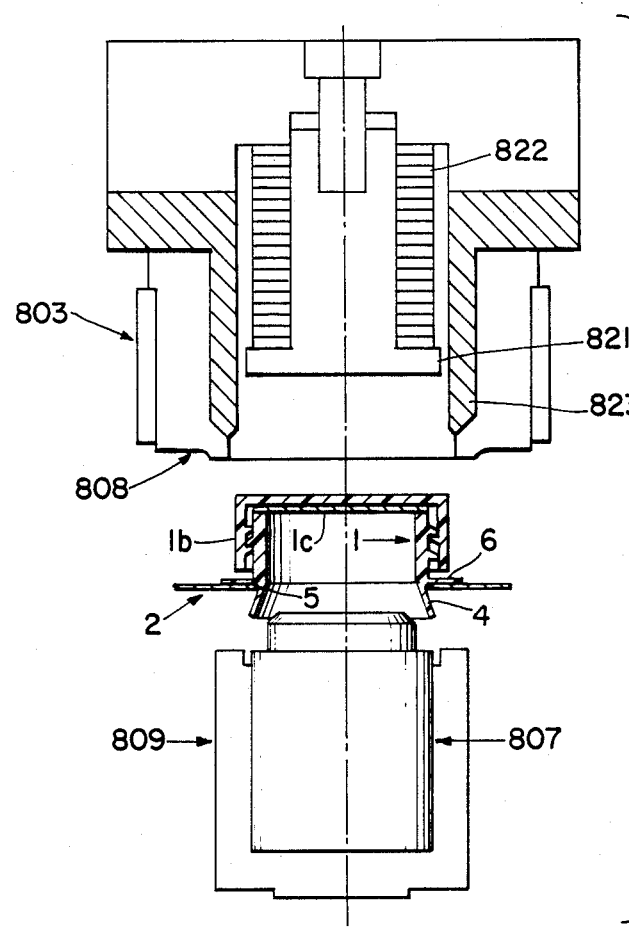
FIG. 8A is a cross-sectional schematic illustration of an alternative system for simultaneously sealing the innermost and outermost flanges of the spout to the carton board, said system being shown prior to closing of the anvils on the fitment and carton board.
Figure 8B:
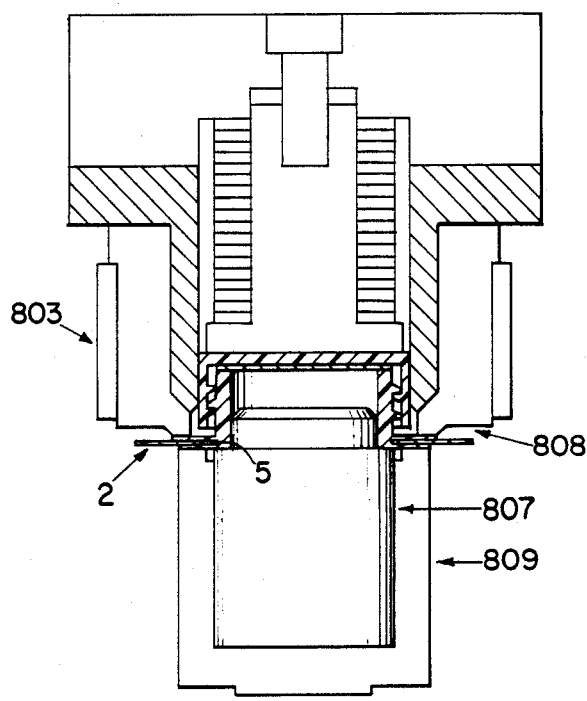
FIG. 8B is a cross-sectional schematic of the system shown in FIG. 8A after the anvils have been closed.

FIGS. 8A and 8B are a schematic representation of a method of simultaneously sealing both the inside and outside flanges of the fitment to the inside and outside surfaces, respectively, of the carton board. In the process illustrated in FIGS. 8A and 8B the fitment and tooling alignment requirements previously described in connection with the spout embodiment shown in FIGS. 2A-2D and 5A-5B are generally applicable. The anvil shapes and sealing process conditions for the inside/outside sealer shown in FIGS. 8A and 8B are also substantially the same as for the sequential heat sealing process described in conjunction with the embodiment of FIGS. 2A-2D and 5A-5B.

FIG. 8A shows the relative positioning of the tooling, fitment and carton prior to swaging and sealing. FIG. 8B shows the relative positioning of the tooling, fitment and carton after swaging and during sealing.

When both the inner and outer flanges are sealed in a single operation, the manner of providing support to the fitment for both the inside and outside seals changes. The fitment receiver 803 can no longer be a single, integral support unit for the fitment. The fitment receiver 803 shown in FIG. 8A has two primary elements, the outside heated sealing anvil 808 and the cap support 821. The cap support 821 should be designed such that the heat generated by the outside sealing anvil 808 is not transferred to the cap 1b during sealing. In the illustrated embodiment a heat resistant insulator 823 is employed for this purpose. If desired, the insulator 823 may be water cooled.

The fitment receiver 803 preferably is joined to the cap support 821 by means of springs 822 which give the cap support 821 the ability to adjust to dimensional variations of the fitment. Also, the carton and fitment support 809 for the outside seal is integrally supported and driven with the inside sealing anvil 807.

To maximize the reduction in cycle time, the pressure and temperature for sealing anvils 807 and 808 is preferably adjusted so as to perform the simultaneous seal within about the same time period used to seal either the outermost or the innermost flanges using the sequential method described earlier herein. Since the seals are performed simultaneously rather than sequentially, the total reduction in cycle time may be as much as 50 percent for each carton.

Alternate One-Piece Spout Design

Figure 7A:
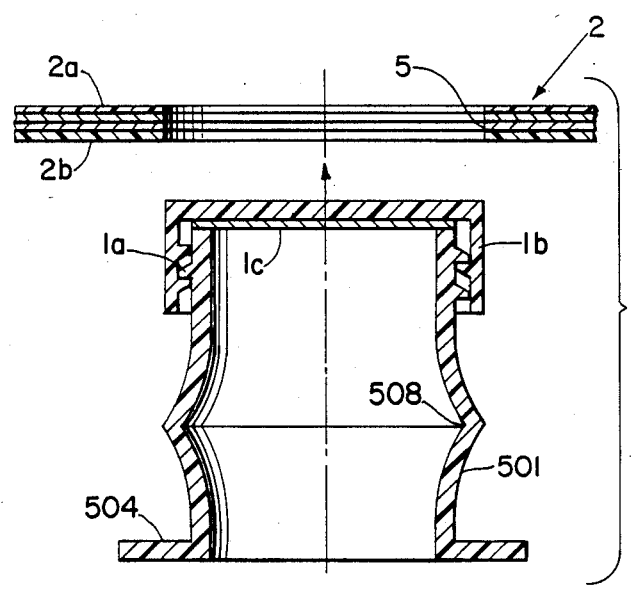
FIG. 7A is a simplified cross-sectional schematic illustration of an alternative pouring spout of the present invention which is inserted through a cut hole in the carton wall from the innermost surface of the carton wall.
Figure 7B:
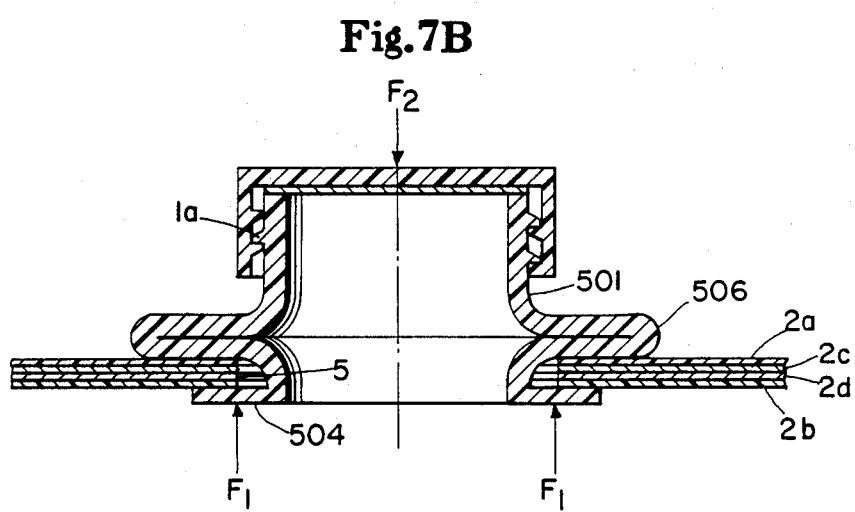
FIG. 7B is a cross-sectional illustration of the pouring spout embodiment shown in FIG. 7A after it has been compressed to form an outermost flange which can be sealed to the outermost surface of the carton wall about the periphery of the cut hole in the carton wall.

An alternate method of positioning a one-piece pouring spout 501 of the present invention into a cut hole 5 in a carton board wall 2 prior to the sealing operation involves pushing the fitment through the cut hole 5 from the interior of the package. An example of a one-piece spout 501 that retains the dual inside/outside liquid tight seal functionality is depicted in FIG. 7A. The one-piece spout 501 includes a threaded portion 1a, a sealing membrane 1c and a threaded reclosure cap 1b identical to those shown in FIG. 1. In this execution a fitment comprising spout 501, sealing membrane 1c and threaded reclosure cap 1b is pushed through the cut hole 5 from inside the package and the inner flange 504 of spout 501 is bottomed against the innermost surface 2b of the carton board. The flange for obtaining an outer liquid tight seal with the exterior layer 2a of the carton board 2 is formed by supporting flange 504 via forces $F_1$ and pushing the threaded portion 1a of spout 501 back toward the carton board via force $F_2$. This collapses the wall of the spout along predetermined hinge ring 508, as generally shown in FIG. 7B. The resulting double-walled flange 506 and the innermost flange 504 are preferably sealed to the opposing surfaces of the carton board 2 about the periphery of the cut hole 5 in a manner generally similar to that previously described in conjunction with spout embodiment 1. As with spout embodiment 1, the cut edges of the hole 5 in the wall of carton board 2 are protected from any exposure to liquid by the liquid tight seals formed between outermost flange 506 and outermost carton board layer 2a and innermost flange 504 and innermost carton board layer 2b, respectively.

While the present invention has been described primarily in the context of a liquid container for products such as milk or juice, it is recognized that the present invention may also be practiced to advantage in many other applications and environments. It will be obvious to those skilled in the art that various changes and modifications can be made without departing from the spirit and scope of the invention, and it is intended to cover in the appended claims all such modifications that are within the scope of this invention.

What is claimed is:

1. A substantially liquid impervious carton having interconnected top, bottom and side walls, said carton being suitable for containing and dispensing liquids, said carton having an exterior surface and an interior surface and being comprised of a laminate material having an intermediate layer comprised of paperboard, an innermost layer located on the interior surface of said carton and an outermost layer located on the exterior surface of said carton, said innermost and outermost layers of said laminate material being substantially impervious to liquid, said carton including a cut hole in one of said walls, said cut hole having a peripheral edge, said wall including said cut hole further including a one-piece preformed polymeric pouring spout having a liquid passageway including a discharge orifice located on the exterior surface of said carton, said preformed pouring spout having a preformed outermost flange and an innermost flange which is formed after insertion of said spout through said cut hole, both said outermost and said innermost flanges being permanently sealed in liquid tight relation about the peripheral edge of said cut hole to the outermost and the innermost layers, respectively, of the laminate material comprising said carton wall, whereby the paperboard layer exposed at the peripheral edge of said cut hole is isolated from any contact with the liquid contained in or dispensed from said carton through the liquid passageway in said one-piece pouring spout as well as any liquid to which said carton is exposed from the environment through which it passes prior to emptying of its contents and disposal thereof.

2. A substantially liquid impervious carton having interconnected top, bottom and side walls, said carton being suitable for containing and dispensing liquids, said carton having an exterior surface and an interior surface and being comprised of a laminate material having an intermediate layer comprised of paperboard, an innermost layer located on the interior surface of said carton and an outermost layer located on the exterior surface of said carton, said innermost and outermost layers of said laminate material being substantially impervious to liquid, said carton including a cut hole in one of said walls, said cut hole having a peripheral edge, said wall including said cut hole further including a one-piece preformed polymeric pouring spout having a liquid passageway including a discharge orifice located on the exterior surface of said carton, said preformed polymeric pouring spout having a preformed innermost flange and an outermost flange which is formed after insertion of said spout through said cut hole, both said outermost and said innermost flanges being permanently sealed in liquid tight relation about the peripheral edge of said cut hole to the outermost and the innermost layers, respectively, of the laminate material comprising said carton wall, whereby the paperboard layer exposed at the peripheral edge of said cut hole is isolated from any contact with the liquid contained in or dispensed from said carton through the liquid passageway in said one-piece pouring spout as well as any liquid to which said carton is exposed from the environment through which it passes prior to emptying of its contents and disposal thereof.

3. The substantially liquid impervious carton of claim 1 or claim 2, including a tamper evident membrane sealingly secured across the discharge orifice of said one-piece polymeric pouring spout.

4. The substantially liquid impervious carton of claim 3, further including resealable closure means releasably secured across the discharge orifice of said one-piece polymeric pouring spout.

5. The substantially liquid impervious carton of claim 4, wherein said pouring spout includes an external groove and said resealable closure means includes a mating internal ring, whereby said resealable closure means can be removed by disengaging said ring and groove from one another and reinstalled and resealed by re-engaging said ring and groove with one another.

6. The substantially liquid impervious carton of claim 4, wherein said pouring spout includes an external thread and wherein said resealable closure means includes a mating internal thread, whereby said resealable closure means can be removed from said pouring spout by disengaging said mating threads from one another and reinstalled and resealed by re-engaging said mating threads with one another.

7. The substantially liquid impervious carton of claim 4, wherein said pouring spout includes an external ring and said resealable closure means includes a mating internal groove, whereby said resealable closure means can be removed by disengaging said ring and groove from one another and reinstalled and resealed by re-engaging said ring and groove with one another.

8. The substantially liquid impervious carton of claim 1 or claim 2, wherein said one-piece polymeric pouring spout is secured in liquid tight relation to a top wall of said carton.

9. The substantially liquid impervious carton of claim 8, wherein said carton comprises a gable top carton having a pair of sloped walls and wherein said top wall to which said pouring spout is secured in liquid tight relation comprises one of the sloped walls of said gable top carton.

10. The substantially liquid impervious carton of claim 1 or claim 2, wherein said innermost and outermost layers of said laminate material are comprised of heat sealable polymeric material and wherein said innermost and outermost flanges on one-piece polymeric pouring spout are continuously fused in liquid tight relation to said innermost and outermost layers, respectively, of said laminate material.

11. The substantially liquid impervious carton of claim 10, wherein said innermost and outermost layers of said laminate material are selected from the group consisting of low density polyethylene, a blend of low density polyethylene and an ionomer, glycol-modified polyethylene terephthalate or polyethylene terephthalate.

12. The substantially liquid impervious carton of claim 11, wherein said one-piece polymeric pouring spout is comprised of high density polyethylene.

13. The substantially liquid impervious carton of claim 10, wherein said innermost and outermost flanges continuously fused to said innermost and outermost layers of said laminate material are flexible enough to deform with the carton wall to which said spout is secured in response to normal shockloads and handling operations without causing separation of said innermost or outermost layers of said carton wall from the remainder of said laminate material comprising said carton wall.

14. The substantially liquid impervious carton of claim 7, wherein said discharge orifice on said one-piece polymeric pouring spout is located in a plane substantially parallel to and remote from the plane of the carton wall to which said pouring spout is sealed in liquid tight relation.

15. The substantially liquid impervious carton of claim 14, wherein the perpendicular distance between the plane of said discharge orifice in said pouring spout and the plane of the carton wall to which said spout is secured in liquid tight relation is sufficiently great that liquid discharged from inside said carton through said discharge orifice cannot strike the carton wall to which said spout is secured during a normal dispensing operation.

16. The substantially liquid impervious carton of claim 15, wherein said liquid passageway and said discharge orifice exhibit a cross-sectional area and configuration which will not permit liquid being discharged from said carton to completely block said liquid passageway and said discharge orifice during a normal dispensing operation, whereby said carton remains vented to the atmosphere throughout said normal dispensing operation.

17. A method for securing a one-piece polymeric pouring spout having a liquid passageway including a discharge orifice and at least one preformed flange oriented substantially perpendicular to said liquid passageway along its length in liquid tight relation to the innermost and outermost surfaces of a carton comprised of a laminate material having an intermediate layer comprised of paperboard and an innermost and outermost layer which are substantially impervious to liquid, said method comprising the steps of:

(a) cutting a hole in a wall of said carton, thereby exposing said paperboard layer at the edges of said cut hole, said hole being large enough to insert said liquid passageway of said one-piece polymeric pouring spout, yet small enough to be totally blocked by said preformed flange on said pouring spout;

(b) inserting said liquid passageway of said one-piece polymeric pouring spout through said cut hole in said carton so that said discharge orifice of said spout is on the exterior of said carton;

(c) bringing said preformed flange on said pouring spout into contacting relation with said carton wall about the periphery of said cut hole so as to block said cut hole in said carton wall;

(d) deforming said liquid passageway in said pouring spout to form a second flange which is also large enough to block said cut hole in said carton wall on the opposite side of said carton wall from said preformed flange; and (e) applying sufficient heat and pressure to said opposing flanges and the carton surfaces they contact to continuously fuse said flanges to the innermost and outermost layers of said carton wall about the periphery of said cut hole, whereby the exposed paperboard layer at the edges of said cut hole is completely isolated from the liquid contained in or dispensed from said carton through said one-piece pouring spout as well any liquid to which said carton is exposed from the environment through which it passes prior to emptying of its contents and disposal thereof.

18. The method of claim 17, wherein said preformed flange on said one-piece pouring spout contacts the outermost surface of said carton wall about said cut hole and wherein said second flange is formed by swaging the innermost end of said liquid passageway against the innermost surface of said carton wall about said cut hole.

19. The method of claim 17 or claim 18, wherein said heat and pressure are applied to said opposing flanges by contacting each of said flanges with an ultrasonically vibrating horn while supporting said carton wall about the periphery of said cut hole by means of a stationary anvil.

20. The method of claim 17, 18 or 19, wherein said flanges are sequentially sealed to the opposing sides of said carton wall about the periphery of said cut hole.

21. A method for securing a one-piece polymeric pouring spout having a liquid passageway including a discharge orifice and at least one preformed flange oriented substantially perpendicular to said liquid passageway along its length in liquid tight relation to the innermost and outermost surfaces of a carton comprised of a laminate material having an intermediate layer comprised of paperboard and an innermost and outermost layer which are substantially impervious to liquid, said method comprising the steps of:

(a) cutting a hole in a wall of said carton, thereby exposing said paperboard layer at the edges of said cut hole, said hole being large enough to insert said liquid passageway of said one-piece polymeric pouring spout, yet small enough to be totally blocked by said preformed flange on said pouring spout;

(b) inserting said liquid passageway of said one-piece polymeric pouring spout through said hole in said carton from the innermost surface of said carton so that said discharge orifice of said spout is on the exterior of said carton;

(c) bringing said preformed flange on said pouring spout into contacting relation with the innermost surface of said carton wall about the periphery of said cut hole so as to block said cut hole in said carton wall;

(d) deforming said liquid passageway of said pouring spout by collapsing said passageway upon itself about a predetermined line of weakness to form a second flange adjacent the outermost surface of said carton wall, said second flange also being large enough to block said cut hole in said carton wall; and (e) applying sufficient heat and pressure to said opposing flanges and the carton surfaces they contact to continuously fuse said flanges to the innermost and outermost layers of said carton wall about the periphery of said cut hole, whereby the exposed paperboard layer at the edges of said cut hole is completely isolated from the liquid contained in or dispensed from said carton through said one-piece pouring spout as well any liquid to which said carton is exposed from the environment through which it passes prior to emptying of its contents and disposal thereof.

22. Apparatus for securing a one-piece polymeric pouring spout having a liquid passageway including a discharge orifice and at least one preformed flange oriented substantially perpendicular to said liquid passageway along its length in liquid tight relation to the innermost and outermost surfaces of a carton comprised of a laminate material having an intermediate layer comprised of paperboard and an innermost and outermost layer which are substantially impervious to liquid, said apparatus comprising:

(a) means for cutting a hole in a wall of said carton, thereby exposing said paperboard layer at the edges of said cut hole, said hole being large enough to insert said liquid passageway of said one-piece polymeric pouring spout, yet small enough to be totally blocked by said preformed flange on said pouring spout;

(b) means for inserting said liquid passageway of said one-piece polymeric pouring spout through said cut hole in said carton so that said discharge orifice of said spout is on the exterior of said carton;

(c) means for bringing said preformed flange on said pouring spout into contacting relation with said carton wall about the periphery of said cut hole so as to block said cut hole in said carton wall;

(d) means for deforming said liquid passageway of said pouring spout to form a second flange which is also large enough to block said cut hole in said carton wall on the opposite side of said carton wall from said preformed flange; and (e) means for applying sufficient heat and pressure to said opposing flanges and the carton surfaces they contact to continuously fuse said flanges to the innermost and outermost layers of said carton wall about the periphery of said cut hole, whereby the exposed paperboard layer at the edges of said cut hole is completely isolated from the liquid contained in or dispensed from said carton through said one-piece pouring spout as well any liquid to which said carton is exposed from the environment through which it passes prior to emptying of its contents and disposal thereof.

23. The apparatus of claim 22, wherein said means for applying heat and pressure to said opposing flanges comprises an ultrasonically vibrating horn and a supporting anvil.

* * * * *

UNITED STATES PATENT AND TRADEMARK OFFICE
CERTIFICATE OF CORRECTION

PATENT NO. : 4,909,434

DATED : March 20, 1990

INVENTOR(S) : DONALD E. JONES AND MICHAEL T. BROWN

It is certified that error appears in the above-identified patent and that said Letters Patent is hereby corrected as shown below:

Column 2, line 65, "r" should read -- or -- .

Column 5, line 29, "receive" should read -- receiver -- .

Column 9, line 17, delete "1" .

Column 17, line 5, Claim 14, "Claim 7" should read -- Claim 9 -- .

Signed and Sealed this

Thirtieth Day of July, 1991

Attest:

HARRY F. MANBECK, JR.

*Attesting Officer*      *Commissioner of Patents and Trademarks*